(12) United States Patent
Hoshino et al.

(10) Patent No.: US 7,621,964 B2
(45) Date of Patent: Nov. 24, 2009

(54) NEAR-FIELD SCANNING OPTICAL MICROSCOPE PROBE HAVING A LIGHT EMITTING DIODE

(75) Inventors: Kazunori Hoshino, Austin, TX (US); Xiaojing Zhang, Austin, TX (US)

(73) Assignee: The Board of Regents, University of Texas System, Austin, TX (US)

( * ) Notice: Subject to any disclaimer, the term of this patent is extended or adjusted under 35 U.S.C. 154(b) by 273 days.

(21) Appl. No.: 11/848,283

(22) Filed: Aug. 31, 2007

(65) Prior Publication Data
US 2008/0054168 A1 Mar. 6, 2008

Related U.S. Application Data

(60) Provisional application No. 60/824,496, filed on Sep. 5, 2006.

(51) Int. Cl.
*G01N 13/14* (2006.01)

(52) U.S. Cl. .............................. 850/32; 850/30; 850/31; 977/862; 977/860; 977/849

(58) Field of Classification Search ................. 250/306, 250/307; 855/30, 31, 32; 977/849, 860, 977/862
See application file for complete search history.

(56) References Cited

U.S. PATENT DOCUMENTS

2006/0097163 A1* 5/2006 Hoen et al. ................. 250/309

\* cited by examiner

*Primary Examiner*—Jack I Berman
*Assistant Examiner*—Hanway Chang
(74) *Attorney, Agent, or Firm*—Anthony P. Ng; Dillon & Yudell LLP

(57) ABSTRACT

An improved near-field scanning optical microscope probe is disclosed. The near-field scanning optical microscope probe includes a probe body and two electrodes extending from the probe body to form a probe tip. In addition, a light-emitting diode is disposed between the two electrodes at the probe tip to act as a light source for the near-field scanning optical microscope probe.

10 Claims, 3 Drawing Sheets

US 7,621,964 B2

NEAR-FIELD SCANNING OPTICAL MICROSCOPE PROBE HAVING A LIGHT EMITTING DIODE

RELATED PATENT APPLICATION

The present patent application claims priority to copending provisional application U.S. Ser. No. 60/824,496, filed on Sep. 5, 2006.

BACKGROUND OF THE INVENTION

1. Technical Field

The present invention relates to near-field scanning optical microscopes in general, and in particular to near-field scanning optical microscope probes. Still more particularly, the present invention relates to a near-field scanning optical microscope probe having a light emitting diode.

2. Description of Related Art

A near-field scanning optical microscope (NSOM) includes a probe designed to be placed close to the surface of a specimen in order to measure optical properties or expose light in a minute area of the specimen. The radius of curvature of the NSOM probe tip is less than the wavelength of light used for measurement. The resolution of a conventional NSOM is directly proportional to the size of its probe. For example, with an aperture probe, the resolving power is approximately 50 nm if the aperture diameter of its probe tip is 50 nm, and with a scattering probe, the resolving power corresponds to the order of the radius of curvature of its probe tip, which is approximately several tens of nanometers.

An NSOM probe is typically made of a pulled fiber optic. A densely-integrated probe array can dramatically increase scanning throughput, but since each probe within the probe array requires an external light source, the NSOM having a probe array tends to be more complex and bulky.

Other approaches for miniaturizing NSOM probes include the usage of probes having micro-electromechanical system (MEMS) apertures and probes having a light absorbing gold particle or a fluorescent bead at the probe tip. However, all those approaches still require an external light source, which lead to the same problem as mentioned above.

Consequently, it would be desirable to provide an improved NSOM probe.

SUMMARY OF THE INVENTION

In accordance with a preferred embodiment of the present invention, a near-field scanning optical microscope probe includes a probe body and two electrodes located close to the tip of the probe body to form a probe tip. In addition, a light-emitting diode is disposed between the two electrodes at the probe tip to act as a light source for the near-field scanning optical microscope probe.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1A:
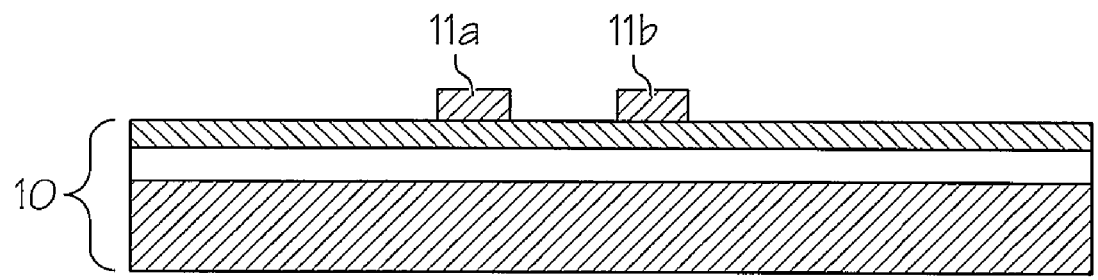
FIGS. 1a-1f are process flow diagrams of a method for manufacturing a near-field scanning optical microscope probe, in accordance with a preferred embodiment of the present invention.
Figure 1B:
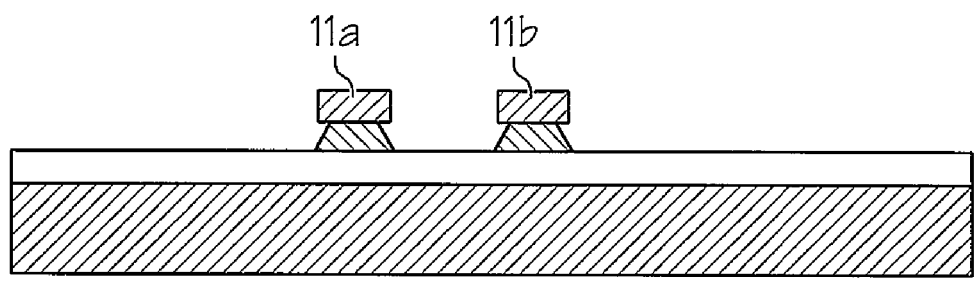
Figure 1C:
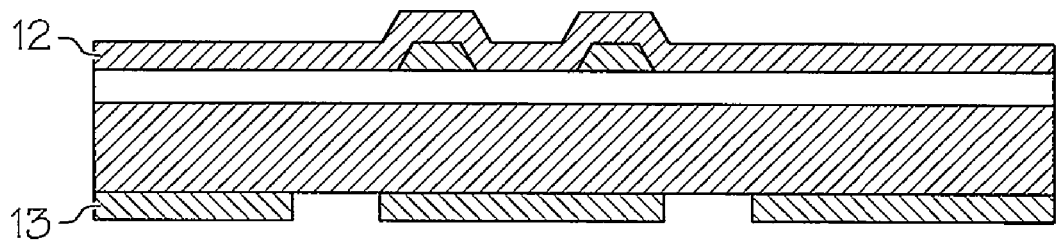
Figure 1D:
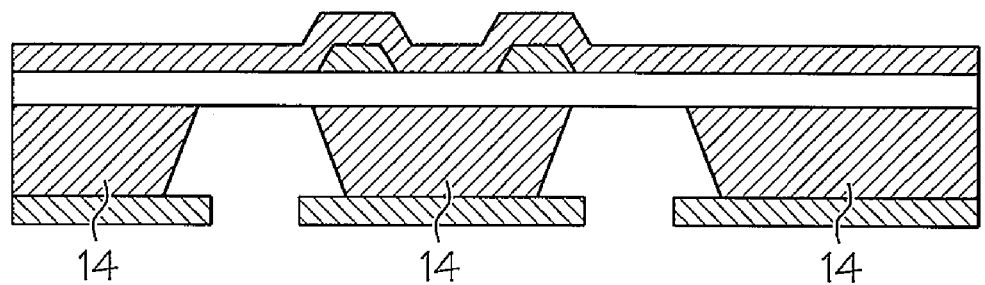
Figure 1E:
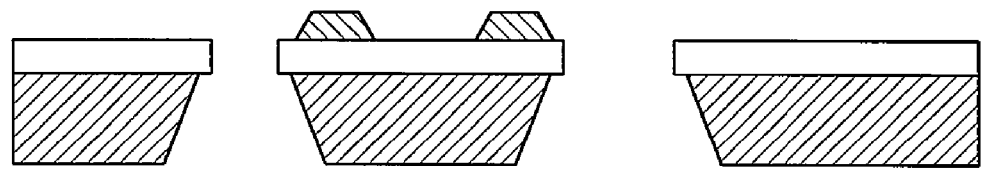
Figure 1F:
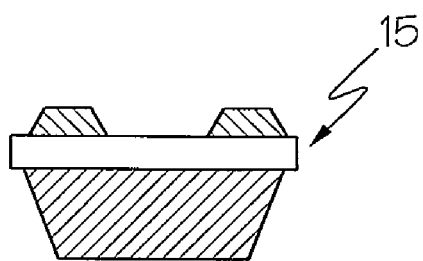

Referring now to the drawings and in particular to FIGS. 1a-1f, there are depicted a set of process flow diagrams of a method for manufacturing a near-field scanning optical microscope (NSOM) probe, in accordance with a preferred embodiment of the present invention. Initially, an oxide layer is deposited on top of a silicon-on-insulator (SOI) substrate 10, and the oxide layer is then patterned and etched to form nodes 11a-11b, as shown in FIG. 1a. A wet etching process using tetramethyl ammonium hydroxide (TMAH) is performed on the top silicon layer of substrate 10 to form a tapered structure underneath each of nodes 11a-11b, as depicted in FIG. 1b. Oxide layers 12-13 are deposited on the top and bottom sides of substrate 10, respectively, and oxide layers 13 is then patterned and etched to form some openings on the bottom side of substrate 10 for further etching, as shown in FIG. 1c. A second wet etching process using TMAH is subsequently performed on the bottom silicon layer of substrate 10 to form several tapered structures 14, as shown in FIG. 1d. Next, oxide layers 12-13 and selected portions of the insulator oxide layer of substrate 10 are removed, as depicted in FIG. 1e, in order to release a probe 15, as shown in FIG. 1f.

Figure 2A:
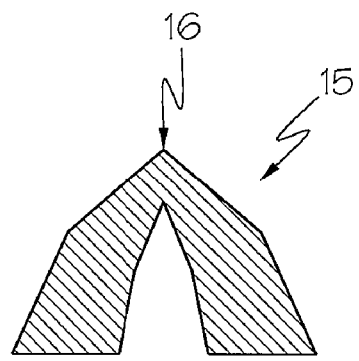
FIG. 2a is a top view and FIGS. 2b-2d are side views of a near-field scanning optical microscope probe manufactured by the method of FIGS. 1a-1f, in accordance with a preferred embodiment of the present invention.
Figure 2B:
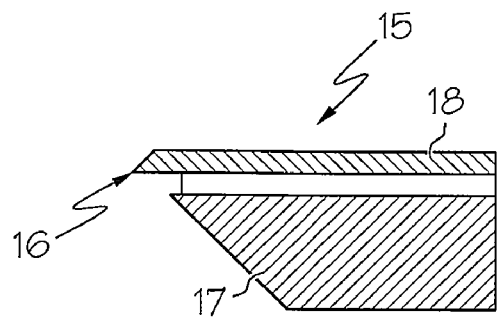
Figure 2C:
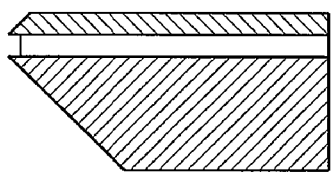
Figure 2D:
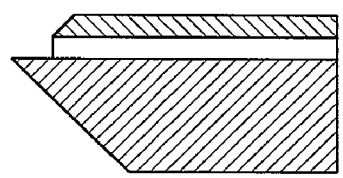

With reference now to FIGS. 2a-2d, there are illustrated a top view and various side views of probe 15 from FIG. 1f, in accordance with a preferred embodiment of the present invention. As shown, probe 15 has a probe body 17 and an electrode 18 having a tapered tip 16. The thickness of probe 15 is approximately 150 μm. The length and the width of probe 15 are 2000 μm and 300 μm, respectively. In FIG. 2a, electrode 18 is shown to be protruded from probe body 17. In FIG. 2b, electrode 18 is shown to be aligned with probe body 17. In FIG. 2c, probe body 17 is shown to be protruded from electrode 18. In addition to the above-mentioned material, electrode 18 can also be made of other materials such as metals, organic semiconductors and inorganic semiconductors.

Figure 3A:
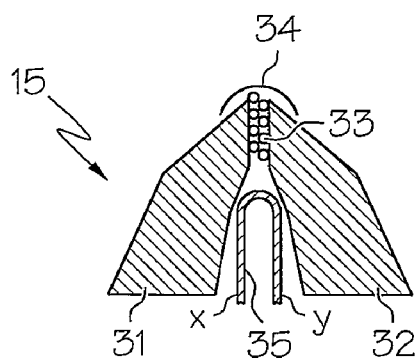
FIGS. 3a-3b are detailed diagrams of the electrodes of a near-field scanning optical microscope probe, in accordance with a preferred embodiment of the present invention.

Referring now to FIG. 3, there is illustrated a diagram of two electrodes of probe 15 from FIG. 2, in accordance with a preferred embodiment of the present invention. Electrodes 31 and 32 are formed by cutting probe 15 from FIG. 2 with a focused ion beam (FIB) at its tip 16. The gap between electrodes 31 and 32 is preferably 200 nm wide and 1.5 μm long. A light emitting diode (LED) 33 is then formed within the gap between electrodes 31 and 32 at tip 16 by electrostatically trapping semiconductor nanoparticles, such as CdSe/ZnS core-shell nanoparticles. The size of a nanoparticle bridge is 300 nm×300 nm.

In order to trap nanoparticles to form LED 33, electrodes 31-32 are immersed in a nanoparticle solution. A voltage is then applied to electrodes 31-32 in order to polarize and attract nanoparticles to the gap between electrodes 31-32 along the electric field gradient. In some cases, electrical charges on the surface are large enough to trap nanoparticles on the electrode without applying any voltage. Preferably, the voltage for trapping nanoparticles is approximately 50 V, and the voltage for driving probe 15 during usage is approximately 145 V. The relatively high driving voltage is due to the large resistance from the 2000 mm long silicon wiring on probe 15. In order to avoid electrical connection to samples to be tested, the trap nanoparticles can be covered with an insulating layer 34, such as a PARYLENE™ layer via a chemical vapor deposition (CVD) process.

Other than electrostatic trapping of particles in a simple solution, particles that have already been aligned by other methods can also be trapped. For example, a film of nanoparticles made by the Lungmuir-blodgett method can also be trapped. A preparation of aligned nanoparticles before trapping gives better control in quality of trapped nanoparticles. In the case of Lungmuir-blodgett film, particles are prepared on the surface of water or soft material. In such a case, the electrodes are not necessarily immersed. The electrodes may just "touch the surface."

Figure 3B:
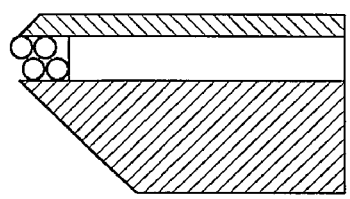

One of the electrodes can be created after trapping semiconductor nanoparticles by means of CVD, evaporation or spin-coating. In addition, a probe body (such as probe body 17 in FIG. 2b) can be utilized as an electrode, as shown in FIG. 3b.

A tuning fork is typically utilized to provide oscillation monitoring for a prior art NSOM probe. Since probe 15 is silicon-based, a piezo resistor 35 can be integrated into probe 15 by adding to the process flow of probe 15 as described in FIGS. 1a-1f. The oscillation frequency of probe 15 can be then be monitored by measuring the resistance of piezo resistor 35 between points x and y. Piezo resistor 35 can be made of silicon. Alternatively, piezo resistor 35 can be replaced by a piezo electric sensor made of an additionally deposited film of lead ziroconate titanate (PZT) or zinc oxide (ZnO).

As has been described, the present invention provides a NSOM probe having an LED. The NSOM of the present invention measures optical properties such as fluorescence on a nano-scale that cannot be measured by conventional atomic force microscopes (AFMs) or scanning tunneling microscopes (STMs).

While the invention has been particularly shown and described with reference to a preferred embodiment, it will be understood by those skilled in the art that various changes in form and detail may be made therein without departing from the spirit and scope of the invention.

What is claimed is:

1. A near-field scanning optical microscope probe comprising:
   a probe body;
   two electrodes located proximate to a tip of said probe body to form a probe tip; and
   a light-emitting diode disposed between said two electrodes at said probe tip.

2. The probe of claim 1, wherein said light-emitting diode is formed by semiconductor nanoparticles.

3. The probe of claim 2, wherein said semiconductor nanoparticles are CdSe/ZnS core-shell nanoparticles.

4. The probe of claim 2, wherein said semiconductor nanoparticles are trapped at said probe tip covered by an insulating layer.

5. The probe of claim 4, wherein said insulating layer is made of PARYLENE™.

6. The probe of claim 1, wherein said probe body further includes a piezo resistor or a piezoelectric sensor.

7. The probe of claim 1, wherein said probe body is utilized as an electrode.

8. A method for manufacturing a near-field scanning optical microscope (NSOM) probe, said method comprising:
   depositing an oxide layer on top of a silicon-on-insulator (SOI) substrate, where the SOI substrate comprises a to silicon layer above the insulator and a bottom silicon layer below the insulator;
   etching said oxide layer to form a plurality of nodes;
   wet etching a top silicon layer of said substrate to form a tapered structure underneath said plurality of nodes;
   depositing oxide layers on top and bottom sides of said substrate;
   etching said oxide layers on top and bottom sides of said substrate to form openings on said bottom side of said substrate for further etching;
   wet etching said bottom silicon layer of said substrate to form a plurality of tapered structures;
   removing said oxide layers and selected portions of said insulator layer of said substrate to release a NSOM probe;
   and forming a light emitting diode by electrostatically trapping semiconductor nanoparticles between the top silicon layer and the bottom silicon layer.

9. The method of claim 8, wherein said top silicon layer is wet etched by using tetramethyl ammonium hydroxide (TMAH).

10. The method of claim 8, wherein said bottom silicon layer is wet etched by using tetramethyl ammonium hydroxide (TMAH).

* * * * *